May 13, 1958 M. PEDERSEN 2,834,138
FISH LANDING GEAR
Filed Nov. 10, 1955 2 Sheets-Sheet 1
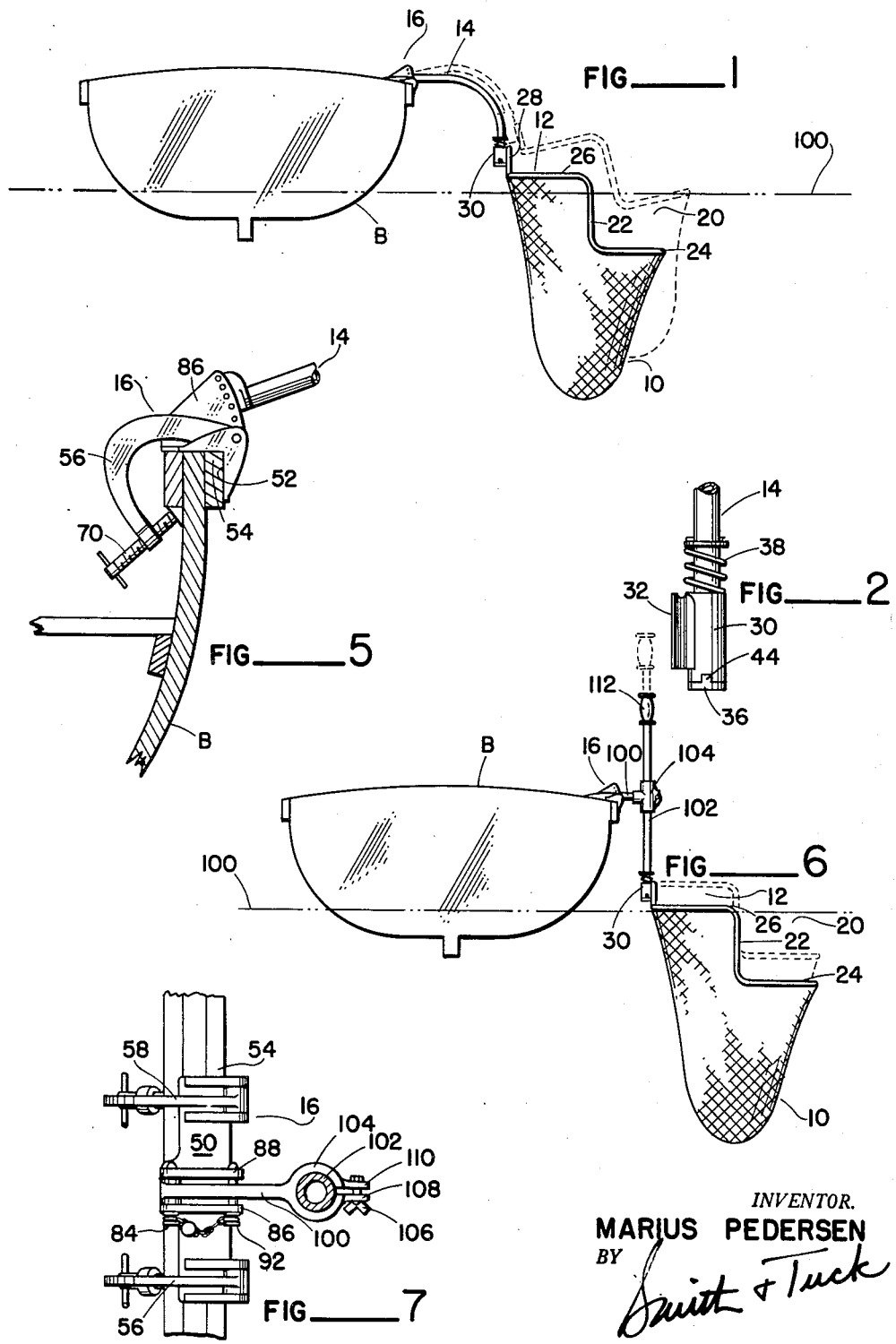
INVENTOR.
MARIUS PEDERSEN
BY
Smith & Tuck May 13, 1958 M. PEDERSEN 2,834,138
FISH LANDING GEAR
Filed Nov. 10, 1955 2 Sheets-Sheet 2
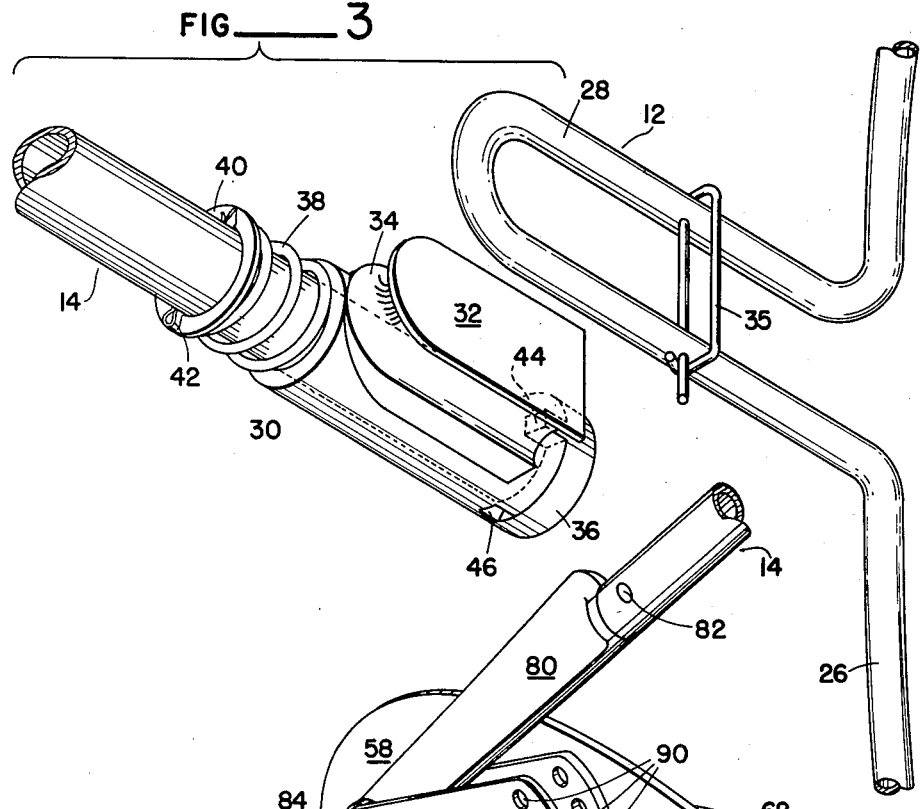
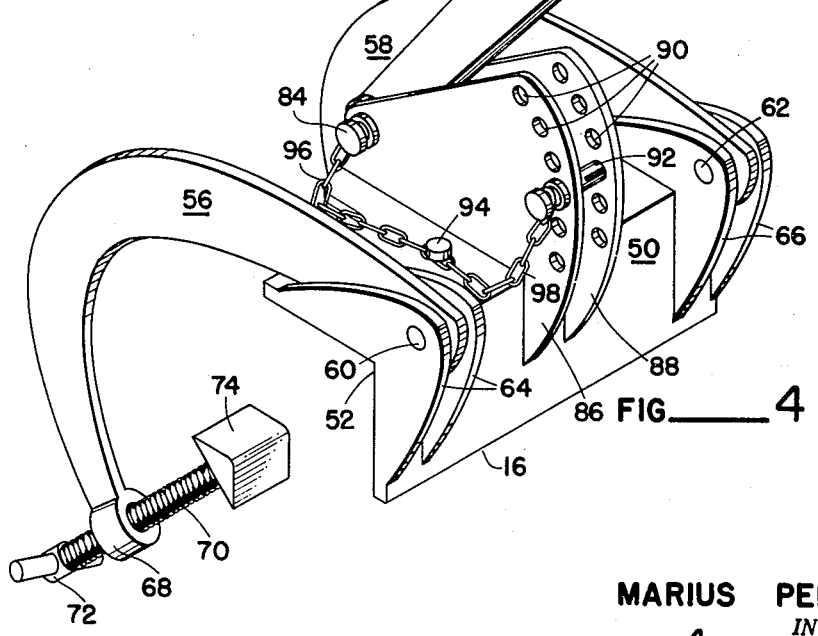
MARIUS PEDERSEN
INVENTOR.

United States Patent Office 2,834,138
Patented May 13, 1958

2,834,138

FISH LANDING GEAR

Marius Pedersen, Ellensburg, Wash.

Application November 10, 1955, Serial No. 546,248

8 Claims. (Cl. 43—11)

My invention relates to fish landing gear and, more particularly, to means supporting a net over the side of a boat for landing and retaining the catch. Briefly, the structure includes a bag-shaped net, a supporting frame for its upper edge having a portion of the perimeter substantially lower than the remainder defining a mouth through which a fish may be led, and supporting means for the frame permitting adjustment of the height of the mouth and the direction in which it faces and pivotally supporting the net so that it may be brought over the boat for unloading fish therefrom.

It is desirable to retain fish after they are caught in a container submerged in water over the side of the boat, to keep the fish alive. Previous devices for this purpose have been often makeshift. Another problem, troublesome in sport fishing, is the use of a landing net with an active fish. Particularly in fishing in rough water, it is difficult for a single fisherman to handle both the pole and landing net and with a rolling boat it is even difficult for two men to land a fish. Inefficient landings cause the loss of many fish. It appears desirable to improve the equipment for the landing of fish in sport fishing.

The objectives of my invention include, therefore: to provide a combination landing net and net for holding caught fish; to devise a landing net mechanically supported from the side of a boat; to provide such a landing net with a mouth through which fish may be led in landing and which will retain the fish after passing through the mouth, and to provide adjustable positioning so that the mouth can be disposed facing in various directions; to provide a pivotal support for such landing and holding net so fish may be brought over the boat for unloading the catch; and to meet the problems set forth above in an economical, easily operated and efficient structure.

My invention will be best understood, together with additional objectives and advantages thereof, from a reading of the following description, read with reference to the drawings, in which:

Figure 1 is a side elevation showing a specific embodiment of my fish landing gear installed on the side of a boat;

Figure 2 is a fragmentary side elevation, on reduced scale, of the means for attaching the net frame to its supporting rod;

Figure 3 is an enlarged perspective view, in fragmentary and exploded form, showing further details of the attachment of the net frame to the supporting arm;

Figure 4 is an enlarged perspective view in fragmentary form showing the clamp structure;

Figure 5 is an enlarged, fragmentary elevational view, partly in section, showing the clamp assembly;

Figure 6 is a view similar to Figure 1 showing a modified form; and

Figure 7 is an enlarged, fragmentary view in plan, partly in section, showing details of the support means of Figure 6.

The principal parts of my fish landing gear are net 10, net supporting frame 12, supporting arm 14 and clamp 16. For convenient transportation and handling in use it is preferred to use a light metal such as an aluminum alloy whenever possible in the construction of the metal parts. Therefore, frame 12 is formed from a single light metal rod, the principal part of the arm 14 is a light metal tube, and the clamp 16 is largely formed from light metal castings.

A suitable size for net 10 would be approximately three feet in height and an average 18 inches in diameter. Its construction and the laced attachment to frame 12 will follow conventional practice and will not be described.

Net frame 12 has a mouth portion 20 substantially lower than the remainder of its perimeter and this lower portion may suitably comprise about 150° of the enclosure. Mouth portion 20 is formed by descending portions 22 and the lower rim portion 24 which may be about 12 inches below the upper portion 26.

Frame 12 has an upstanding, U-shaped portion 28 for attachment to supporting arm 14. Connecting arm 14 carries an adjustable locking and positioning sleeve 30 having on one side a block 32 which has an inverted U-shaped groove 34. The U-shaped frame portion 28 snugly fits groove 34 and may be locked thereon during use by the locking pin 35. These parts may be readily disassembled for transportation.

Sleeve 30 is rotatable on arm 14 between an end abutment 36 and a compression spring 38, which is held in compression by the ring abutment washer 40 secured by cotter pin 42. End abutment 36 has an upstanding lug 44 which may be inserted in one of three latching recesses 46 separated 90° apart on sleeve 30. By these latching means, mouth 20 of net 10 can be directed away from the boat or directed to either side simply by upward pressing of sleeve 30 and rotation until lug 44 latches in a different recess 46. Mouth 20 hence can be faced in the direction from which the fish is being led by the line. This has proved to be a very valuable feature in landing a fish and avoids the necessity of either changing the facing of the boat while landing the fish or of leading the fish around to the mouth of the net. The ability to face the mouth forward or aft from the side of the boat is dependent, it will be observed, on arm 14 positioning the rotatable sleeve 30 a considerable distance outward of the boat so that there will be room for half of the net inside of the end of supporting arm 14.

A clamp block 50 provides a right angular seat 52 to abut the side and top members at the edge of the boat B at 54. C-shaped clamp members 56, 58 are pivotally connected to block 50 by pins 60, 62 extending through paired abutment plates 64, 66. Clamp members 56, 58 have enlarged ends 68 provided with tapped openings for clamping screws 70. Screws 70 have manually operable handles 72 at one end and V-shaped blocks 74 pivotal on their other end and directed toward seat 52. It will be understood that the clamp structure is adaptable for the various types of boat members at the sides or stern on which it may be desired to install the landing gear.

The tubular portion of supporting arm 14 is connected at its inner end to a solid end piece 80 by pin 82 and end member 80 is pivotally secured to clamp 16 by a removable spring cotter 84 extending through paired plate quadrants 86, 88. Quadrants 86, 88 have a series of paired openings 90 radially disposed relative pivot cotter 84 and a second spring cotter 92 forms an abutment for the lower edge of supporting arm 14 and can be located in any one of the paired openings. Cotters 84, 92 are secured to a common pin 94 by a chain 96, 98 to prevent loss. By the quadrant assembly, the lower edge 24 of net mouth 20 can be positioned at various levels relative the water line 100. Between landings, probably the net will be raised from the position shown in Figure 1 and the mouth will be lowered to the position shown in Figure 1 during the landing of the fish. The roughness of the water will influence the desirable level of the net.

One surprising feature of this construction is the use of the lower mouth portion 20 of the net. From first impression, it would appear that fish previously caught and retained in net 10 would swim out of it when the net is disposed in the position shown in Figure 1 and that the fish being landed would swim back out of the mouth as soon as the line was loosened. However, this it not the case. The inclination of a fish during landing is to dive as soon as the line is slack, and once he is led in mouth 20, slackening of the line will only result in his diving to the bottom of net 10. Likewise, previous live fish retained in net 10 will try to escape downward and normally will not escape through the top even when net mouth 20 is partially submerged below water line 100. Of course, it is very convenient to be able to lead a fish into a net in this manner without having to raise him, and my construction in use avoids loss of fish and fish are more readily netted even by one man than has been previously the case.

Another surprising result obtained with this structure is the unloading of the fish from the net. Particularly with the light structure used, the fisherman can easily pivot connecting arm 14 about its pivot 84 to bring the net over the boat when it is desired to unload the catch.

Figures 6 and 7 illustrate a modification in which a different assembly is substituted for the arm 14 of Figure 1. An arm 100 is disposed between quadrants 86, 88 and pivotally attached thereto by spring cotter 84. Arm 100 can be raised and lowered according to the adjustable positioning of spring cotter 86, but further adjustment of height is provided by a verticaly movable rod 102 which is mounted in a split sleeve 104 attached to arm 100. A wing bolt and nut 106 passing through lugs 108, 110 on sleeve 104 provides means for adjustably clamping upright rod 102 in position. The lower end of upright rod 102 connects to the net assembly in a manner identical to the corresponding portion of arm 14. The upper end of upright rod 102 forms a handle having a grip 112 which is useful in adjusting the height of the net and in swinging arm 100, rod 102, frame 12 and net 10 inboard for discharge of fish. Upright rod 102 is also rotatably adjustable in split, clamping sleeve 104 to change the facing of net mouth 20 as a supplemental or substitute adjustment for the adjustable sleeve 30.

The way in which the objectives of the invention have been met, and additional objectives and advantages thereof, will appear from the preceding description. I do not wish to be limited to the exact details of construction shown, but instead wish to cover those modifications thereof which will occur to those skilled in the art after seeing my disclosure, which are within the scope of my invention, as defined in the appended claims.

I claim:

1. A fish landing net adapted to be supported on the edge of a boat, comprising: a rod upper frame and a fish net of bag form having an upper edge and depending from said frame which extends around the bag upper edge, a clamp adapted to be secured to the side of a boat, and a supporting arm connected to said clamp at one end and secured in supporting relationship to one edge of said frame at its other end, the supporting arm extending from said clamp in position so that the major part of said net may be submerged in the water, and said frame having a portion thereof which is offset from the one edge secured to said supporting arm for disposition in a plane substantially lower than the remainder of said frame forming a mouth to be located below water level through which fish may be led into said net.

2. The subject matter of claim 1 in which there is manually adjustable securing means between said frame and said supporting arm holding said frame against tipping relative the portion of the supporting arm to which it connects and rotatably supporting the frame so that said mouth may be faced away from the boat and to either side.

3. The subject matter of claim 1 in which the supporting arm is pivotally connected to said clamp and said clamp has a quadrant and a manually adjustable stop adjustable on said quadrant radially relative a point of pivotal connection and supporting said arm at various levels whereby said mouth may be positioned at various levels relative the water level.

4. A fish landing gear adapted to be secured to the side of a boat, comprising: a bag-shaped net and a rigid frame having two offset portions, one above the other supporting the upper edges of the net in two parallel planes, a clamp adapted to be secured to the edge of a boat and a supporting arm between extending between the clamp and the uppermost of the two offset portions of the frame, the supporting arm extending outwardly and downwardly relative the clamp whereby the frame may be supported from the boat with a side of the net partially disposed above the waterline and the remainder immersed in the water, a first end of said supporting arm being secured to said frame supporting the same from tilting relative the portion of the arm to which it connects and the other end of said supporting arm being pivotally connected to said clamp to swing in an upright plane, and manually operable movable stop means on said clamp limiting the downward pivoting of said supporting arm relative said clamp whereby the frame may be positioned at various levels relative the water line and permitting the net to be swung over the boat edge to unload the contents.

5. A fish landing gear adapted to be secured to the edge of a boat, comprising: a bag-shaped net and a rigid supporting frame secured to the upper edges of the net, a clamp adapted to be secured to the edge of a boat, and a supporting arm extending between said clamp and said frame, said supporting arm extending outwardly and downwardly from said clamp and said clamp having stop means operable to secure said supporting arm from downward movement, said frame having a portion of its perimeter offset from and substantially lower than the remainder forming a downwardly located mouth relatively the point of attachment of said arm to said frame, and the end of said supporting arm being secured to said supporting frame by means supporting the frame against downward tilting relative the portion of said arm to which it connects and rotatably supporting the frame on the arm for rotation into positions about the axis of said supporting arm whereby said mouth may be faced outwardly or sideways relative the position of said clamp so that fish may be led into said mouth from any of several directions.

6. The subject matter of claim 5 in which the means securing the frame to the arm includes a sleeve to which said frame is attached rotatable on the arm between an end abutment and a companion spring on the arm, said end abutment and said sleeve having interengaging latch means therebetween for latching said sleeve in one of several positions and means pressing said compression spring toward said sleeve thereby pressing the interengaging latch means into locked engagement, the spring being manually overcome by pressing the sleeve away from the abutment for changing the latched position, whereby said net mouth can be locked in position facing outwards or sideways relative the clamp.

7. The subject matter of claim 6 in which the frame is secured to said sleeve by a block on the sleeve having a U-shaped groove and said frame having a U-shaped bend fitting in said groove and manually operable means for securing the bend in the groove from disengagement.

8. The subject matter of claim 4 in which said supporting arm includes an upright handle extending upwardly therefrom, intermediate the clamp and to the frame, and which may be manually grasped to swing said net inboard.

References Cited in the file of this patent

UNITED STATES PATENTS

| | | |
|---|---|---|
| 952,225 | Aiken | Mar. 15, 1910 |
| 1,532,367 | Bockman | Apr. 7, 1925 |
| 2,157,003 | Mussina | May 2, 1939 |
| 2,278,308 | Fairchild | Mar. 31, 1942 |
| 2,591,891 | Thorsen | Apr. 8, 1952 |
| 2,726,477 | Firkins | Dec. 13, 1955 |